United States Patent [19]

Griffin et al.

[11] Patent Number: 4,509,720
[45] Date of Patent: Apr. 9, 1985

[54] VALVE SHAFT END FLOAT CONTROL

[75] Inventors: Michael D. Griffin, Rochester; John A. Gural, Pittsford; Donald J. Lamirande, Spencerport, all of N.Y.

[73] Assignee: General Motors Corporation, Detroit, Mich.

[21] Appl. No.: 511,534

[22] Filed: Jul. 7, 1983

[51] Int. Cl.³ .............................. F16K 1/22; F16D 1/12
[52] U.S. Cl. .................................... 251/308; 411/188; 411/417; 403/97; 403/261; 251/305
[58] Field of Search ........................ 251/305, 308, 307; 411/116, 119, 187, 188, 189, 417, 427; 403/97, 257, 259, 261, 383; 464/187

[56] References Cited

U.S. PATENT DOCUMENTS

| 2,146,142 | 2/1939 | Heasley | 251/308 |
|---|---|---|---|
| 2,779,612 | 1/1957 | Edelen . | |
| 2,888,285 | 5/1959 | Gerwig | 251/279 |
| 4,377,361 | 3/1983 | Frieberg | 411/188 |

FOREIGN PATENT DOCUMENTS 57-86537  5/1982  Japan .

Primary Examiner—Samuel Scott
Assistant Examiner—G. Anderson
Attorney, Agent, or Firm—C. K. Veenstra

[57] ABSTRACT

A throttle valve shaft projecting from a boss on an internal combustion engine throttle body has a nut which is adjustable for establishing a selected clearance between the nut and the boss to thereby limit end float or axial displacement of the shaft. A lever or other retainer secured to the shaft has an interfering engagement with the nut to prevent rotation of the nut about the shaft and thereby maintain the selected clearance between the nut and the boss.

2 Claims, 6 Drawing Figures

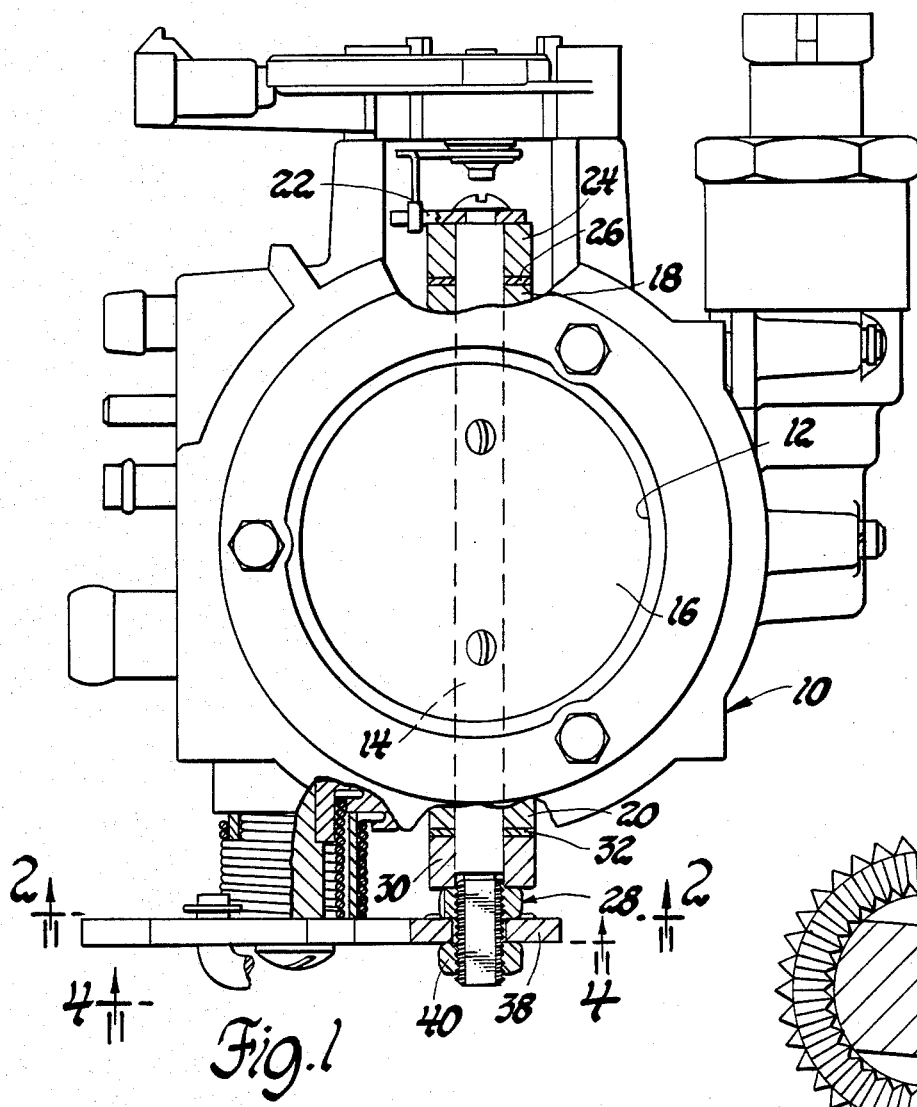
Fig.1
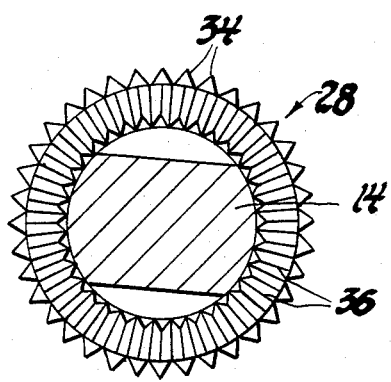
Fig.2
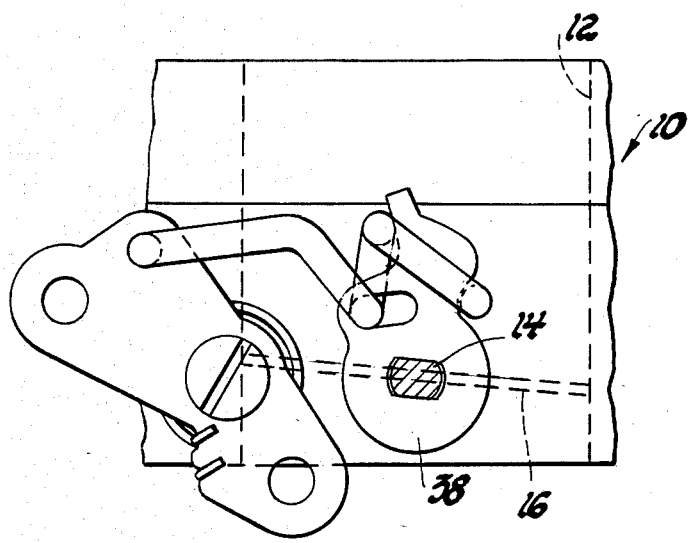
Fig.4
Fig.3

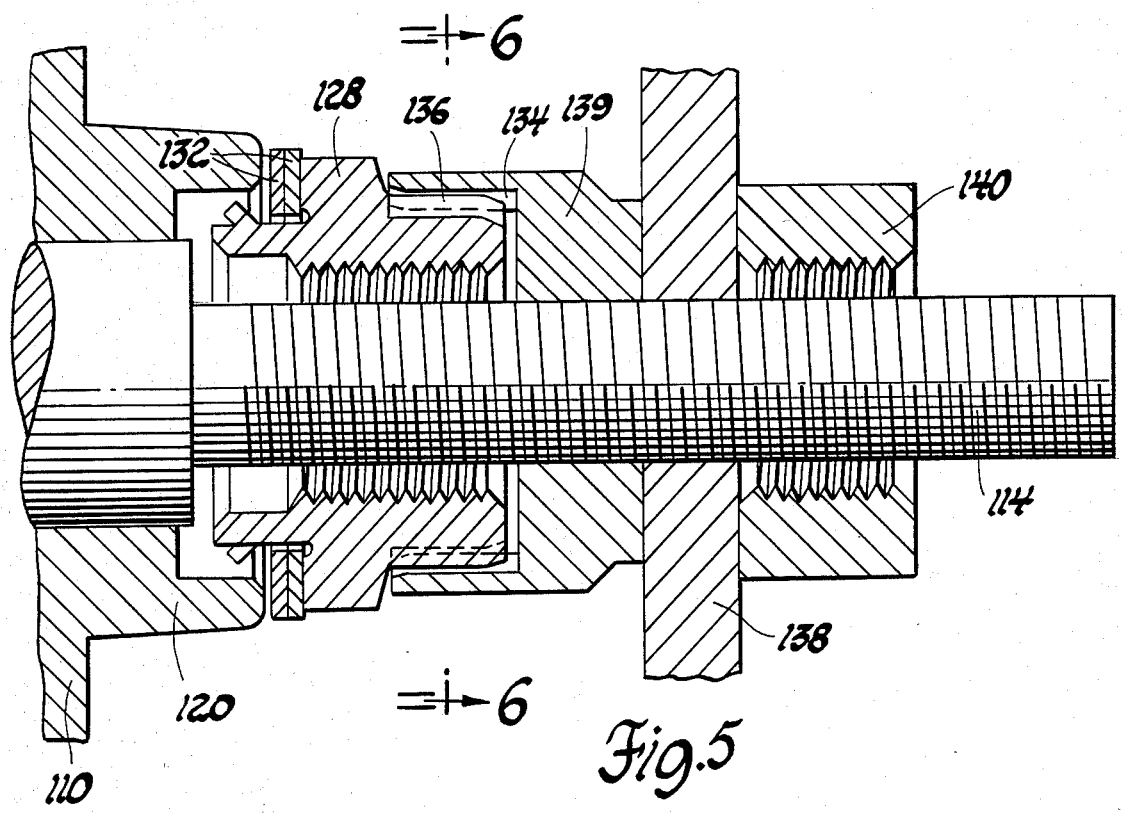
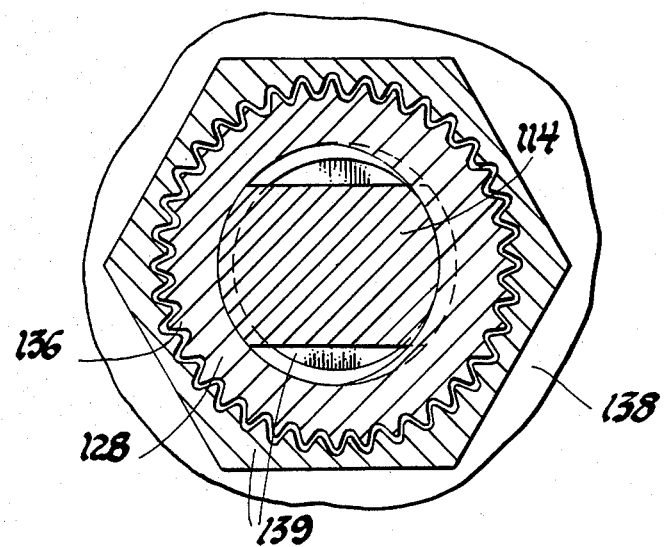

VALVE SHAFT END FLOAT CONTROL

TECHNICAL FIELD

This invention relates to a valve assembly constructed to limit end float or axial displacement of a valve shaft journalled for rotation in a valve body.

BACKGROUND

Air flow to conventional automotive spark ignition internal combustion engines is controlled by a butterfly throttle valve secured to a valve shaft which is journalled for rotation in a throttle body. A throttle lever secured to the shaft is operated to position the throttle valve so that the desired air flow is admitted through the throttle body to the engine.

In some applications, an axial load on the shaft can cause the throttle valve to scrape on its bore. The wear which can result tends to admit more air flow through the throttle body than was originally calibrated for a particular throttle position.

SUMMARY OF THE INVENTION

This invention provides a valve assembly constructed to limit axial displacement of the valve shaft and thereby preclude substantial wear of the valve on its bore.

In a valve assembly according to this invention, a valve shaft projects through a boss on a valve body and a nut is threaded on the end of the shaft to establish a selected clearance between the nut and the boss. A valve lever or other retainer secured to the shaft has an interfering engagement with the nut to prevent rotation of the nut about the shaft; the interfering engagement accordingly holds the nut in place on the shaft to maintain the selected clearance.

The details as well as other features and advantages of two embodiments of this invention are set forth in the remainder of the specification and are shown in the accompanying drawings.

SUMMARY OF THE DRAWINGS

FIG. 1 is a plan view of an internal combustion engine throttle body providing a throttle valve assembly constructed according to this invention.

FIG. 2 is a sectional view taken along line 2—2 of FIG. 1 showing ribs coined on the nut to provide interfering engagement with the throttle lever.

FIG. 3 is an edge view of the nut showing the details of its construction.

FIG. 4 is a sectional view along line 4—4 of FIG. 1 showing the throttle lever secured on the throttle shaft.

FIG. 5 is a sectioned view of another throttle valve assembly constructed according to this invention.

FIG. 6 is a sectional view along line 6—6 of FIG. 5 showing splines which provide interfering engagement between the nut and the retainer.

THE PREFERRED EMBODIMENTS

Referring first to FIGS. 1-4, a throttle body 10 for an automotive spark internal combustion engine has a bore 12 forming a portion of an induction passage for air flow to the engine. A throttle shaft 14 is journalled in throttle body 10 and extends across bore 12. A throttle valve 16 is secured to shaft 14 in a conventional manner.

As shown in FIG. 1, each end of shaft 14 projects from a boss 18, 20 on throttle body 10. At the remote end, a throttle position sensor lever 22 is secured to shaft 14, and a spacer 24 and a shim 26 space lever 22 from boss 18.

The near end of shaft 14 has a double D configuration in cross-section as shown in FIGS. 2 and 4 and is threaded to receive a nut 28. A spacer 30 and a shim 32 surround the near end of shaft 14 to space nut 28 from boss 20. The threaded engagement between nut 28 and shaft 14 allows nut 28 to be positioned on shaft 14 to establish a selected clearance between nut 28 and boss 20. The outer perimeter of nut 28 has a series of teeth 34 which allow automated equipment to adjust the position of nut 28 on shaft 14 during assembly so that the selected clearance is established.

The surface of nut 28 adjacent spacer 30 is smooth, but the opposite surface of nut 28 is coined to provide a series of ribs 36 which extend radially and project axially as shown in FIGS. 2 and 3.

A throttle lever 38 slides onto shaft 14 and has a complementary double D configuration which secures lever 38 and shaft 14 for concomitant rotation. The surface of lever 38 adjacent nut 28 is coined with a corresponding series of ribs which mesh with ribs 36 on nut 28; lever 38 thereby acts as a retainer to secure nut 28 against rotation on shaft 14 which would disturb the selected clearance between nut 28 and boss 20.

As shown here, lever 38 is retained on shaft 14 by a nut 40. It will be appreciated, however, that other means may be used to retain lever 38 on shaft 14.

Adjustment of nut 28 on shaft 14 to establish a selected clearance between nut 28 and boss 20 limits the end float or axial displacement of shaft 14 within throttle body 10 to minimize or preclude entirely the potential for wear of valve 16 on its bore 12. The interfering engagement between nut 28 and lever 38 provided by ribs 36 assures that the selected clearance is maintained thereafter.

It will be appreciated that the interfering engagement between nut 28 and lever 38 may be maintained by a variety of structures. For example, a locking tab extending from lever 38 to engage nut 28 could be used in place of the coined ribs 36. The embodiment shown in FIGS. 5-6 provides an even more secure construction.

Referring to FIGS. 5-6, a throttle shaft 114 projects from a boss 120 on a throttle body 110. The end of shaft 114 has a double D configuration in cross-section as shown in FIG. 6 and is threaded to receive a nut 128. A pair of shims 132 is carried on nut 128 to space nut 128 from boss 120. The threaded engagement between nut 128 and shaft 114 allows nut 128 to be positioned on shaft 114 to establish a selected clearance between nut 128 and boss 120. The outer perimeter of nut 128 has a series of external splines 136 which allow automated equipment to adjust the position of nut 128 on shaft 114 during assembly so that the selected clearance is established.

A throttle lever 138 slides onto shaft 114 and has a complementary double D configuration which secures lever 138 and shaft 114 for concomitant rotation. A retainer 139 is sandwiched between throttle lever 138 and nut 128 and also has a complementary double D configuration which secures retainer 139 and shaft 114 for concomitant rotation. Retainer 139 has a series of internal splines which mesh with splines 136 on nut 128; retainer 139 thereby secures nut 128 against rotation on shaft 114 which would disturb the selected clearance between nut 128 and boss 120.

As shown here, lever 138 is retained on shaft 114 by a nut 140. It will be appreciated, however, that other means may be used to retain lever 138 on shaft 114.

Adjustment of nut 128 on shaft 114 to establish a selected clearance between nut 128 and boss 120 limits the end float or axial displacement of shaft 114 within throttle body 110. The interfering engagement between nut 128 and retainer 139 provided by splines 136 assures that the selected clearance is maintained thereafter.

The embodiments of the invention in which an exclusive property or privilege is claimed are defined as follows:

1. A valve assembly comprising a valve body defining a fluid flow passage, a valve shaft journalled for rotation in said body and extending across said passage, a valve member in said passage secured to said shaft and rotatable with said shaft to control flow through said passage, said body having an external boss, and wherein said shaft has a threaded end projecting from said boss, a nut is threaded on said end of said shaft, the position of said nut on said shaft being adjustable during assembly for establishing a selected clearance between said nut and said boss to thereby limit end float of said shaft, a retainer is secured to and rotatable with said shaft, and said retainer has an interfering engagement with said nut for preventing rotation of said nut about said shaft and consequent axial movement of said nut along said shaft to thereby maintain said clearance.

2. A valve assembly comprising a valve body defining a fluid flow passage, a valve shaft journalled for rotation in said body and extending across said passage, a valve member in said passage secured to said shaft and rotatable with said shaft to control flow through said passage, and a valve lever secured to and rotatable with said shaft, said body having an external boss, and wherein said shaft has a threaded end projecting from said boss, a nut is threaded on said end of said shaft, the position of said nut on said shaft being adjustable during assembly for establishing a selected clearance between said nut and said boss to thereby limit end float of said shaft, and a retainer is disposed about said shaft between said nut and said lever, said retainer being secured to and rotatable with said shaft and having a splined engagement with said nut for preventing rotation of said nut about said shaft and consequent axial movement of said nut along said shaft to thereby maintain said clearance.

* * * * *